US007142220B2

(12) United States Patent
Platt et al.

(10) Patent No.: US 7,142,220 B2
(45) Date of Patent: *Nov. 28, 2006

(54) ALPHA CORRECTION TO COMPENSATE FOR LACK OF GAMMA CORRECTION

(75) Inventors: John C. Platt, Redmond, WA (US); Mikhail M. Lyapunov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/076,396

(22) Filed: Mar. 9, 2005

(65) Prior Publication Data
US 2005/0151753 A1 Jul. 14, 2005

Related U.S. Application Data

(63) Continuation of application No. 10/308,510, filed on Dec. 3, 2002.

(51) Int. Cl.
*G09G 5/02* (2006.01)

(52) U.S. Cl. ............... 345/589; 345/629; 345/597; 345/601

(58) Field of Classification Search ............... 345/589, 345/629, 597, 601
See application file for complete search history.

(56) References Cited

U.S. PATENT DOCUMENTS

| 5,990,903 | A | 11/1999 | Donovan | 345/589 |
| 6,738,526 | B1* | 5/2004 | Betrisey et al. | 382/260 |
| 2001/0048764 | A1 | 12/2001 | Betrisey et al. | 382/162 |
| 2003/0169268 | A1 | 9/2003 | Tang et al. | 345/581 |

OTHER PUBLICATIONS

U.S. Appl. No. 10/308,510, filed Dec. 3, 2002, John Platt et al.

* cited by examiner

*Primary Examiner*—Kee M. Tung
*Assistant Examiner*—Mike Rahmjoo
(74) *Attorney, Agent, or Firm*—Workman Nydegger

(57) ABSTRACT

The blending coefficients (alpha values) of font glyphs undergo alpha correction to compensate for a lack of gamma correction in text rendering processes. The alpha correction includes selecting a set of correction coefficients that correspond to the predetermined gamma value of the display device and computing corrected alpha values from the known alpha values, the foreground colors, and set of correction coefficients. The corrected alpha values can then be used to blend the foreground and background colors of the corresponding display pixels without requiring gamma correction. Accordingly, the alpha correction can be performed by a GPU, which is not configured to perform gamma correction, thereby increasing the speed at which text rendering can occur.

11 Claims, 6 Drawing Sheets

ALPHA CORRECTION TO COMPENSATE FOR LACK OF GAMMA CORRECTION

CROSS-REFERENCE TO RELATED APPLICATIONS

This application is a continuation of application Ser. No. 10/308,510, filed Dec. 3, 2002, and entitled "ALPHA CORRECTION TO COMPENSATE FOR LACK OF GAMMA CORRECTION" the disclosure of which is incorporated herein by reference, in its entirety.

BACKGROUND OF THE INVENTION

1. The Field of the Invention

The present invention relates to display rendering processes and, more particularly, to font glyph rendering processes that include alpha value correction.

2. Background and Related Art

In standard software text rendering, one or more font glyphs represent each image of text that is displayed at a display device. Likewise, each font glyph is represented by one or more blending coefficients that represent how much of a font glyph's foreground color should be added to the background for each pixel that is used to display the font glyph. These blending coefficients are typically referred to as alpha ($\alpha$) values. Other images can also be represented by a blending between a foreground and a background.

Once the alpha values are determined, they can be used to blend the foreground and the background colors of each pixel. Blending ideally occurs in linear color space where, for example, a minimum value indicates no photons will be used to render a pixel and where a maximum value indicates a maximum amount of photons will be used. The pixel colors that are derived from blending, however, typically have to undergo a gamma correction process before they are rendered in order to compensate for the non-linearity in how the display device renders color. Gamma correction essentially compensates for a gamma value of the display device. The gamma value of display devices may vary from device to device. The blending and gamma correction processes utilized to render images at a display device are well-known rendering processes in the art.

Blending and gamma correction typically occur through software applications. It has been realized, however, that the text rendering processes could be performed much more quickly if they were to be performed by a dedicated hardware component, such as a graphics processing unit (GPU), instead of requiring the resources of the central processing unit (CPU). One problem with performing blending with a GPU, however, is that existing GPUs are not configured to perform gamma correction. And without gamma correction, if the alpha values are filtered via the ClearType method, the rendered text would have undesired color fringes around the edges of the displayed text characters due to the non-linearity (gamma value) of the display devices. The problem is further compounded because the background values are stored in the GPU and are only slowly accessible by the CPU.

In the Microsoft NT4 operating system, gamma correction is not performed after blending, in order to save CPU cycles. As an approximation, the alpha values are adjusted by performing gamma correction on the alpha values themselves before blending. This approximation, however, is inexact because it does not take into account whether the foreground color is dark or light. Adjusting the alpha while ignoring the foreground color results in increasing the error of the approximation for half of the possible foreground colors.

Accordingly, there currently exists a need in the art for improved methods for accelerating text rendering, without access to the background colors, without requiring gamma correction, but while utilizing knowledge of the foreground colors.

BRIEF SUMMARY OF THE INVENTION

The present invention is directed to methods, systems, and corresponding computer program products for correcting the filtered alpha values corresponding to font glyphs to compensate for a lack of gamma correction.

According to one aspect of the invention, performing alpha correction includes the acts of selecting a set of correction coefficients that correspond to the predetermined gamma value of the display device and computing corrected alpha values that can be used to blend the foreground and background colors of the corresponding display pixels and without gamma correction. Because the invention eliminates the need for gamma correction and the alpha correction does not need access to the background colors, the processes for rendering font glyphs can largely be performed by a GPU, thereby increasing the overall speed at which text rendering can occur.

In one embodiment, the corrected alpha values are computed on the GPU via the formula $(\alpha_{corrected} = \alpha + \alpha(1-\alpha)(c_1 \alpha f + c_2 \alpha + c_3 f + c_4)$, wherein $\alpha_{corrected}$ is the corrected alpha, $\alpha$ is alpha, and f is the gamma corrected foreground luminance, and $(c_1, c_2, c_3$ and $c_4)$ are a set of correction coefficients. This formula is applied once per alpha value.

Thereafter, upon obtaining the corrected alpha values for each display pixel, the foreground and background colors of the display pixels are blended, thereby generating appropriate pixel display values for enabling the font glyph to be displayed without color fringing and without requiring gamma correction.

An optimal set of correction coefficients ($c_1, c_2, c_3$ and $c_4$) that are used to help derive the corrected alpha values can be computed once by minimizing the error of the alpha correction. Thereafter, blending can occur without gamma correction. This minimization of the error of the alpha correction can occur at software design time, and is carried out by a constrained optimization algorithm or other similar procedure.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to methods, systems, and corresponding computer program products for performing alpha correction during image rendering processes to compensate for a lack of gamma correction. The embodiments of the present invention may include or be performed with a special purpose or general-purpose computer including various computer hardware, as discussed in greater detail below. In particular, embodiments of the invention may be practiced with a graphics processing unit (GPUT).

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

Alpha Correction

Figure 1:
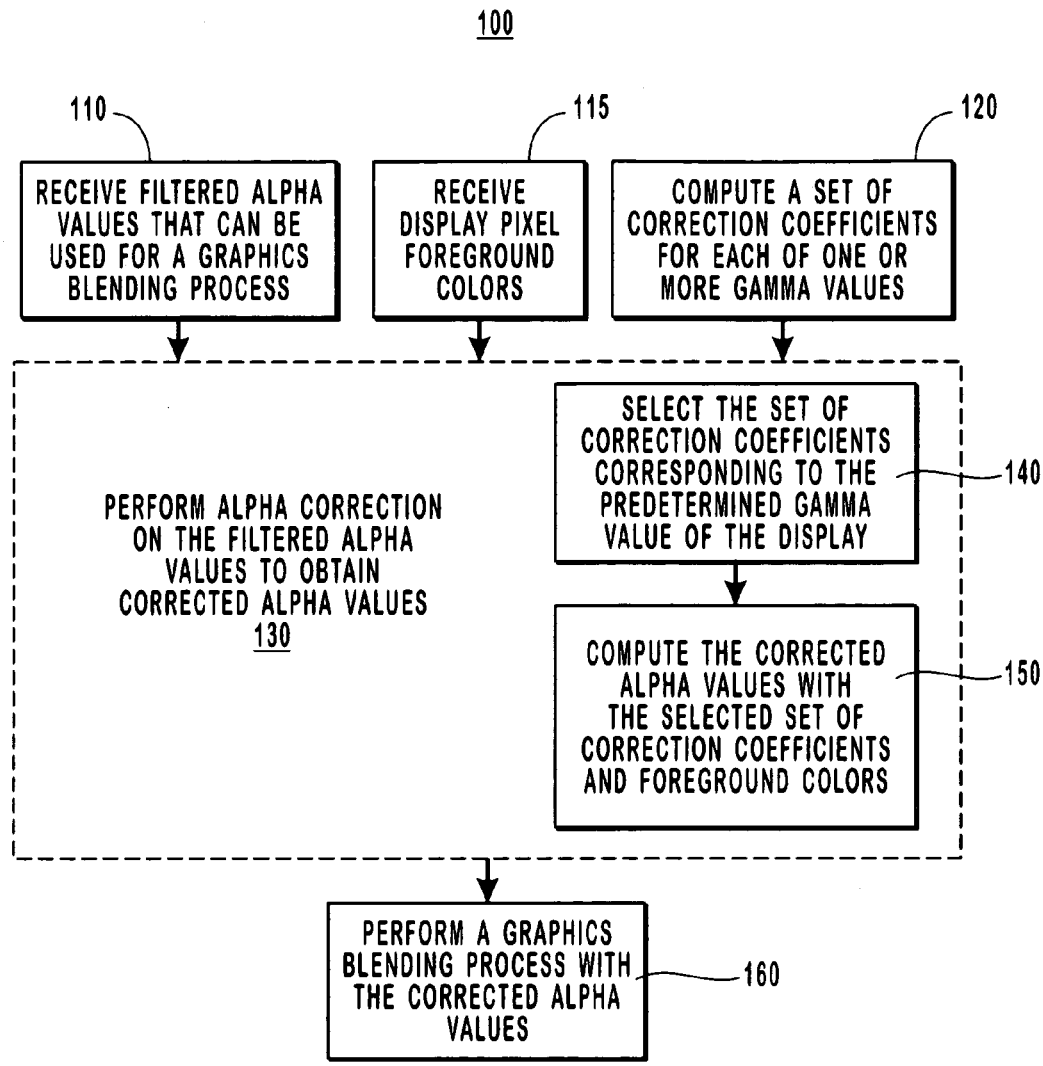
FIG. 1 a flowchart illustrating a method for correcting filtered alpha values to compensate for a lack of gamma correction.

FIG. 1 illustrates a flowchart 100 of one method for correcting filtered alpha values to compensate for a lack of gamma correction. In font glyph rendering processes, filtered alpha values, which are also known as blending coefficients, are derived for each pixel that is used to display the font glyph. In certain embodiments, only a single alpha value is computed for each display pixel. In other embodiments, utilizing Microsoft's ClearType® technology, a separate alpha value is computed for each pixel sub-component (e.g., Red, Green, Blue sub-components). Accordingly, it will be appreciated that the present invention extends to various embodiments and is not, therefore, limited to embodiments in which only a certain number of alpha values are derived for each display pixel.

As shown in FIG. 1, one method for correcting filtered alpha values to compensate for a lack of gamma correction includes various acts (acts 110, 120, 140, 150 and 160) and a step (step 130) that will each now be described in more detail with specific reference to FIGS. 2–5.

The first illustrated act includes receiving filtered alpha values that can be used for a graphics blending process (act 110). The filtered alpha values are typically used in existing font glyph rendering processes during blending and prior to a gamma correction. However, according to the present invention, the filtered alpha values are used to derive adjusted or corrected alpha values that can be used to blend the foreground and background colors of the display pixels and in such a way that post blending gamma correction is not required. The filtered alpha values, which may be obtained from any source, generally describe the shape of the font glyph to be displayed.

The illustrated method also includes an act of receiving the display pixel foreground colors (act 115). This receipt of the display pixel foreground colors enables the present invention to perform the desired alpha correction based upon the known foreground colors and optimal correction coefficients, as described below in specific reference to FIGS. 2–5.

A set of correction coefficients are computed, according to FIG. 1, for each of one or more gamma values (act 120). Note that the set of correction coefficients need not be derived from a computation, but in an alternate embodiment, can be tuned by hand. Act 120 can also be performed at software design time, while all other acts in FIG. 1 may be performed when an image is being rendered.

In the present embodiment, each gamma value is associated with four, correction coefficients, including $c_1$, $c_2$, $c_3$ and $c_4$. The correction coefficients may be computed for any selected range of gamma values. The gamma value of the display device that will be used to render the font glyphs is preferably included as one of the selected set of gamma values. In one embodiment, the selected set of gamma values includes gamma values in the range of between 1.0 and 2.2, in steps of 0.1, although this range may vary.

Figure 2:
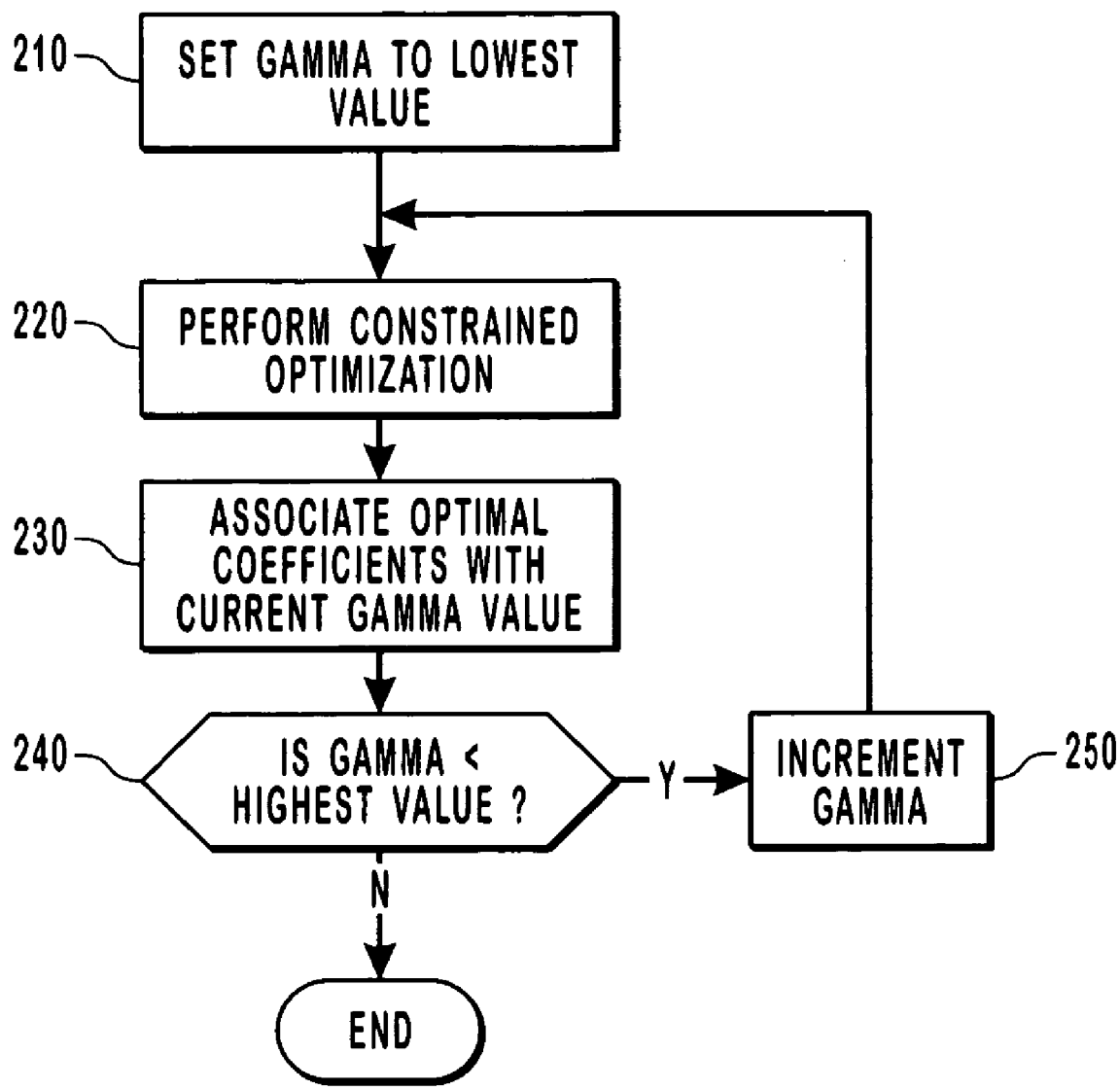
FIG. 2 is a flowchart of an optimization routine that includes certain acts that can be performed while computing the set of correction coefficients corresponding to predetermined gamma values.

According to one embodiment, the act of computing the set of correction coefficients that correspond to the various gamma values is accomplished by performing the acts illustrated in the flowchart 200 of FIG. 2 at software design time. The first illustrated act includes setting gamma to the lowest gamma value in the selected range of gamma values (e.g., 1.0 according to the range provided above) (act 210). Next, constrained optimization is performed (act 220), using the gamma value, to determine the optimal set of correction coefficients that correspond to the gamma value. This is accomplished, according to one embodiment, through combining a constrained optimization routine with the acts that are illustrated in the flowchart 300 of FIG. 3.

Figure 3:
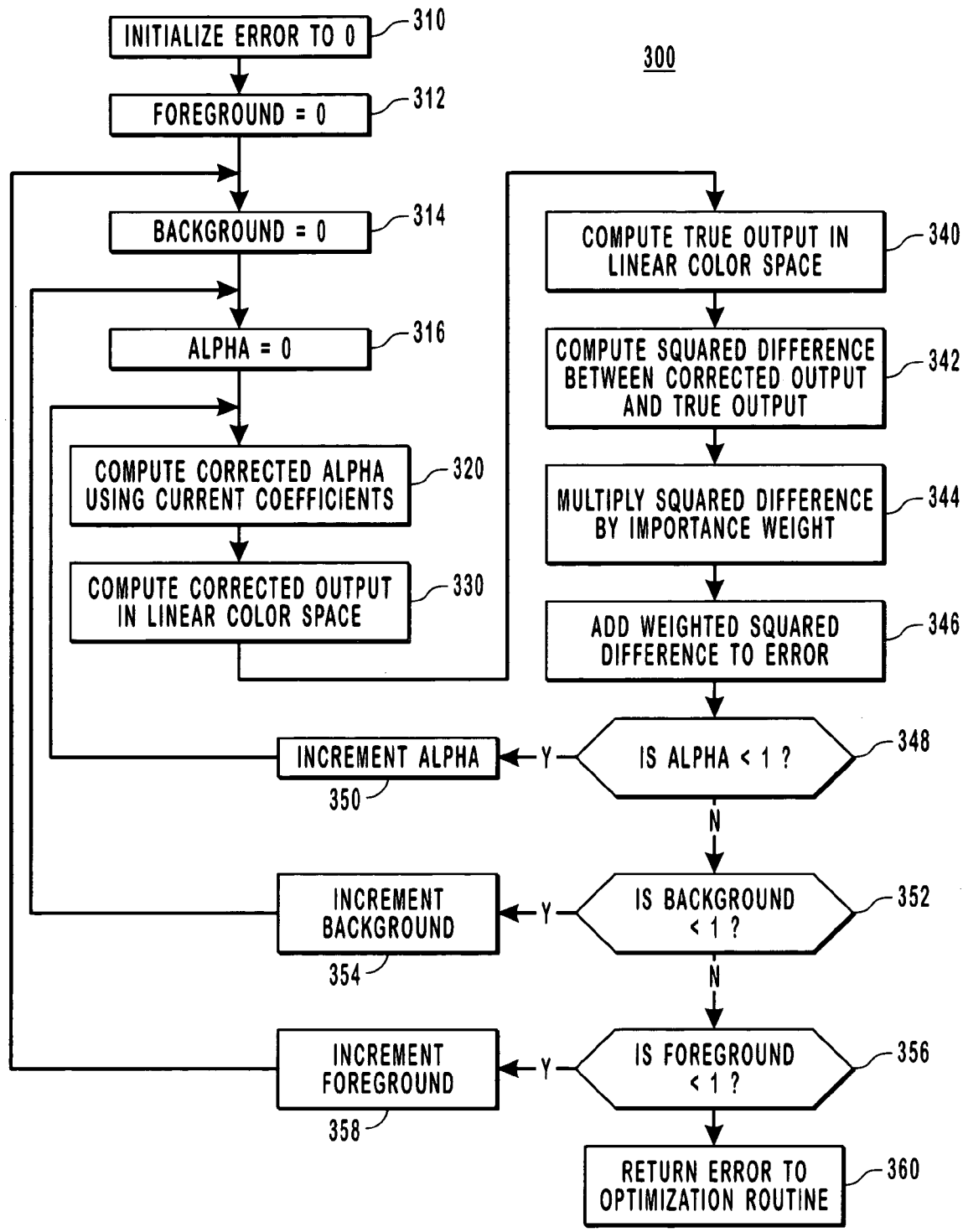
FIG. 3 is a flowchart illustrating one embodiment of constrained optimization that may be involved in computing an optimal set of correction coefficients.

The flowchart 300 of FIG. 3 includes a plurality of acts that may be performed to minimize the calculated error between a true output and a corrected output of blended foreground and background colors. More particularly, the difference between the true output and the corrected output of luminance are calculated using various predetermined values of alpha, foreground, background, and the correction coefficients $c_1$, $c_2$, $c_3$ and $c_4$. This is done to assist a constrained optimization routine to determine the optimal correction coefficients that are associated with a predetermined gamma value, such as the gamma value of the display device.

Initially, the error, foreground, background and alpha values are set to zero (acts 310–316). Next, the corrected alpha is computed using a first set of correction coefficients satisfying a predetermined set of constraints (act 320). According to one embodiment, the corrected alpha is derived from the formula ($\alpha corrected = \alpha + \alpha(1-\alpha)(c_1 \alpha f + c_2 \alpha + c_3 f + c_4)$), wherein $\alpha corrected$ is the corrected alpha, $\alpha$ is alpha, and f is the gamma corrected foreground luminance. The corrected alpha formula is illustrated as a functional chart 400, as well as in its basic form 410 in FIG. 4.

Figure 4:
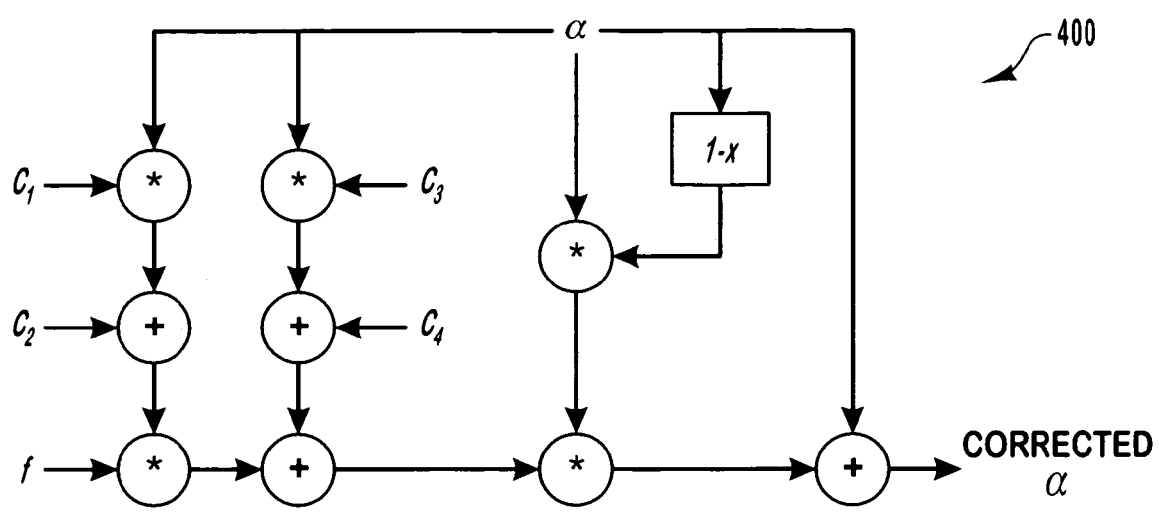
FIG. 4 illustrates a diagram and corresponding formula for computing corrected alpha values from known alpha values, foreground, and correction coefficients.

In one embodiment, the predetermined set of constraints utilized during this constrained optimization (act 220) includes: ($c_4 \geq -1$); ($c_3 + c_4 \geq -1$); ($c_1 + c_2 + c_3 + c_4 \leq 1$); ($c_4 \geq -4$); ($c_3 + c_4 \geq -4$). These constraints were chosen to ensure that the correction in FIG. 4 is monotonic and does not produce a value outside [0,1]. This set of constraints, however, is merely illustrative one suitable set of constraints that may be utilized and should not, therefore, be construed as limiting the scope of the invention. During constrained optimization, the values of the correction coefficients will be incrementally adjusted within the range of constraints to calculate the error between the true output and the corrected output for each possible value of f, $\alpha$, and B (background), with f, $\alpha$, and B ranging from between about 0 to about 1 at incremental steps of about 0.02.

The calculated output is generally calculated with the use of the corrected alpha value from act 320 (act 330). More particularly, the calculated output comprises the blended value of the gamma corrected foreground $f = F^{(1/\gamma)}$ and the gamma corrected background $b = B^{(1/\gamma)}$, wherein f is the gamma corrected foreground, F is the predetermined foreground value, $\gamma$ is the value of gamma, b is the gamma corrected background, and B is the predetermined background value. The corrected output is calculated according to act 330.

The true output is also calculated (act 340) by blending the predetermined foreground (F) with the predetermined background (B) with alpha ($\alpha$). Thereafter, the squared difference between the corrected output and the true output is squared (act 342) and multiplied by an importance weight (346). Finally, the weighted squared difference is added to the error value (act 346). These acts are then repeated, as determined by acts (348, 350, 352, 354, 356 ad 358), until all values of F, B and $\alpha$ have been used to calculate the error. The error is then recalculated iteratively, utilizing various combinations of $c_1$, $c_2$, $c_3$ and $c_4$, until the minimum error is determined for the predetermined gamma value at each combination of F, B and $\alpha$. The error is then returned to the optimization routine shown in FIG. 3 (act 360).

The acts illustrated in FIG. 3 comprise one suitable method for computing a cost function suitable for constrained optimization. Constrained optimization routines require such cost functions to find the minimum error. One suitable constrained optimization routine is Matlab's fmincon function, which implements Sequential Quadratic Programming. Matlab's fmincon function and Sequential Quadratic Programming are well-known in the art. It will be appreciated, however, that the foregoing example is merely illustrative and should not, therefore, be construed as limiting the scope of the invention. In particular, other techniques and algorithms can also be used to obtain the optimal correction coefficients that correspond with the predetermined set of gamma values and within a predetermined set of constraints. For example, if the error is computed in gamma corrected space (as opposed to linear space), then the cost function computed in FIG. 3 is quadratic in the correction coefficients $c_1$, $c_2$, $c_3$, $c_4$. Therefore, the optimization can be performed analytically (solving a linear system) and does not require a constrained optimization routine.

As shown in FIG. 2, the optimal correction coefficients $c_1$, $c_2$, $c_3$, $c_4$ obtained from the constrained optimization are then associated with the gamma value which was used to obtain the optimal coefficients $c_1$, $c_2$, $c_3$, $c_4$ (act 230). Association between the optimal correction coefficients and a corresponding gamma value can be made, for example, in a table or other data structure. The values of F, B and $\alpha$, which were used to obtain the minimum error can also be associated with the optimal coefficients for latter reference. As illustrated by acts 240 and 250, the optimization routine 200 is iteratively performed until the optimal correction coefficients have been determined for each gamma value in the predetermined range of gamma values.

The data structure associating the optimal coefficients and gamma values can be stored in one or more computer-readable media, such as, for example, as a part of software package. When the image needs to be rasterized, correction coefficients are submitted to GPU for access during the font glyph rendering processes. In one embodiment, the associating data structure is stored in the GPU directly. In another embodiment, the associating data structure is preliminary combined with foreground color values and/or some constants to accommodate for specific hardware requirements before being stored in the GPU.

During image rendering, the associating data structure is accessed to perform alpha correction on the filtered alpha values that are received by the GPU (step 130). It will be appreciated that step 130 may include any number of corresponding acts to perform alpha correction. In one embodiment, the step of performing alpha correction (step 130) includes the corresponding acts of selecting the set of correction coefficients corresponding to the predetermined gamma value of the display (act 140). This may be accomplished, for example, by accessing the associating data structure described above and selecting the correction coefficients that have been associated with the gamma value of the display. According to one preferred embodiment, the act of selecting or receiving the correction coefficients (act 140) is performed at display rendering time, whereas the act of computing the set of selected correction coefficients (act 120) is performed at design time.

Next, the correction coefficients and the foreground colors are used to compute the corrected alpha values that will be used to blend the foreground and background of the display pixels (act 150). In one embodiment, this is accomplished with the use of the formula 410 illustrated and described above in reference to FIG. 4. In particular, $\alpha_{corrected} = \alpha + \alpha(1-\alpha)(c_1 \alpha + c_2 \alpha + c_3 f + c_4)$, wherein $c_1$, $c_2$, $c_3$ and $c_4$ comprise the correction the known foreground color of a display pixel, and wherein $\alpha$ is the known alpha value of a display pixel. As mentioned above, the corrected $\alpha$ value may be computed any number of times per display pixel. By way of example, and not limitation, a corrected $\alpha$ may be computed for each pixel sub-component of a display pixel. In particular, display pixels including Red, Green and Blue pixel sub-components, may include three filtered $\alpha$ values that are used to compute three corrected α values. It will be appreciated that this can be particularly useful for rendering font glyphs with Microsoft ClearType® rendering techniques.

Once the corrected α values are computed (act 150), they can then be used to perform a graphics blending process (act 160) to blend the foreground and background colors of the corresponding display pixels.

According to one embodiment, the step of performing alpha correction and the step (step 130) of performing a blending operation (act 160) are performed within a GPU, which helps to increase the rate at which font glyph rendering can occur.

Figure 5:
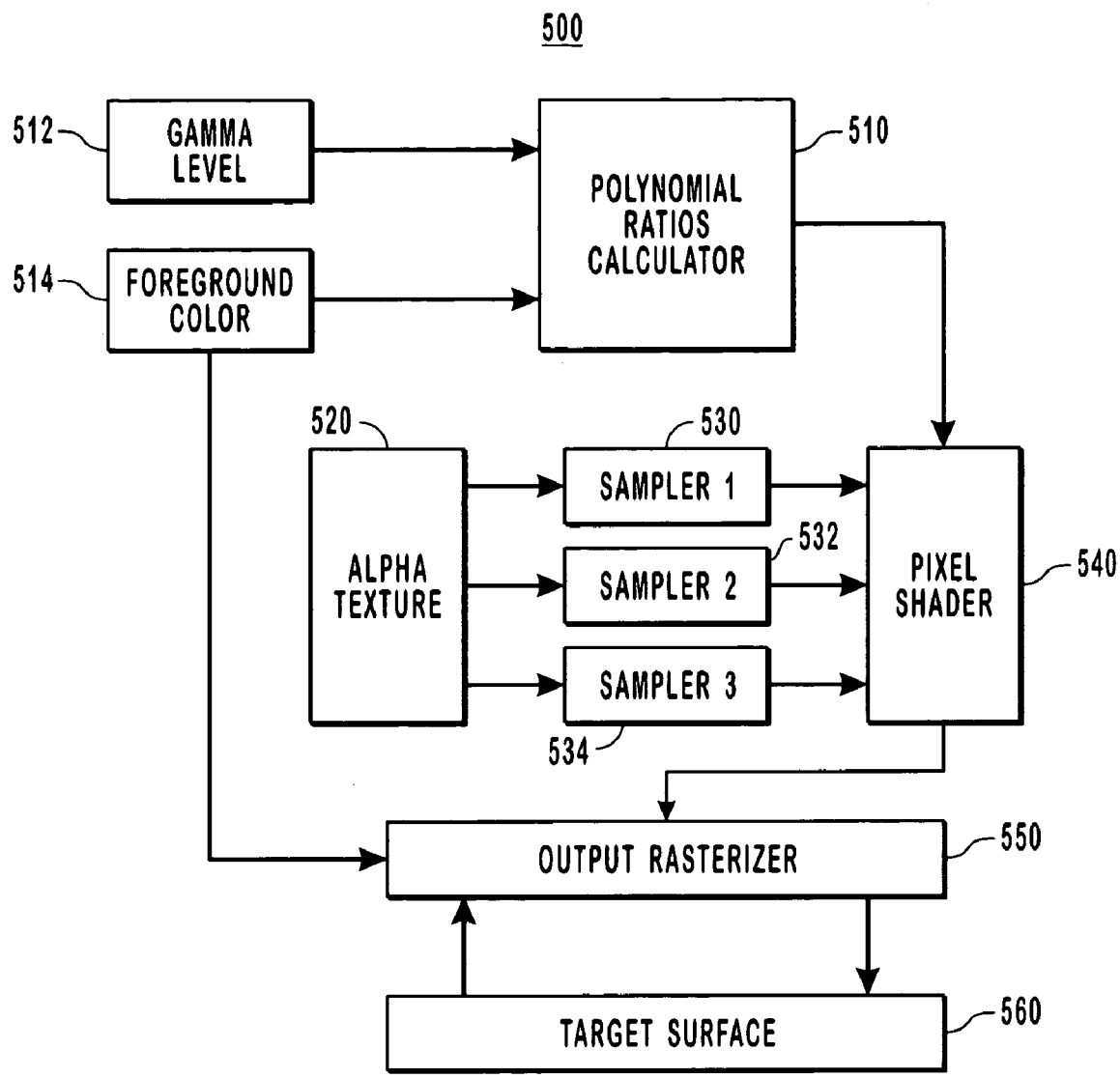
FIG. 5 illustrates a functional block diagram of components and elements that may be utilized by a GPU during a rendering process that does not include gamma correction.

FIG. 5 illustrates one implementation of the rendering processes described above. It will be appreciated, however, that the foregoing implementation is merely illustrative, and should not, therefore, be construed as limiting the scope of the invention. The foregoing examples can be reproduced by those of skill in the art of computer programming practices. The embodiment shown in FIG. 5 illustrates that the rendering process of the invention is feasible on the base of existing hardware, and that multiple color channels can be calculated in parallel.

The present embodiment may implement the invention with program modules based on Microsoft's DirectX® program package that provides unified application program interface (API) for variety of hardware types. According to one embodiment, the present implementation is not completely device independent as far as it assumes hardware to support pixel shaders version 1.1 and blending factor mechanism (Microsoft DirectX® terms are used here and below).

In FIG. 5, the diagram 500 represents the data flows between hardware and software blocks. Input data are displayed as "Gamma level" (512), "Foreground color" (514) and "Alpha texture" (520) blocks. Gamma level is the number that reflects physical display features of the display device. The gamma level is used to choose proper correction coefficients $c_1$, $c_2$, $c_3$ and $c_4$ from the pre-calculated table or other associating data structure. The selection of correction coefficients occurs at the "Polynomial ratios calculator" 510. The polynomial ratios calculator also obtains the foreground color and calculates corresponding ratios and stores them into constant registers of the pixel shader (540).

The shape to display (a text fragment) is prepared as a two-dimensional array of alpha values that is shown as "Alpha texture" block 520. The alpha values are fetched from alpha texture three times per pixel, using three samplers given as "Sampler 1" (530), "Sampler 2" (532) and "Sampler 3" (534). The samplers supply the pixel shader 540 with alpha values for the red, green and blue color sub-components.

The pixel shader 540 executes non-linear calculations and generates the vector of corrected alpha values, for the red, green and blue color sub-components, which are provided to the output rasterizer 550. The output rasterizer 550 provides linear blending between the background color, fetched from the render target surface 560, and the foreground color, supplied as a blending factor, using alpha values obtained from the pixel shader 540. The resulting color values are stored at the render target surface 560.

The pixel shader 540 operates with four-dimensional vectors of floating point values. The vector components are referred using suffixes .a, .r, .g and .b, which correspond to the alpha, red, green and blue components. The entities capable to keep these vectors are called "registers" (not shown). The pixel shader 540 operates with input registers (tn—i.e. t0, t1, t2, etc.), constant registers (cn) and temporary registers (rn) to perform the alpha correction described above. In the example provided below, the temporary register r0 serves as an output register.

According to the present embodiment, the pixel shader 540 is an adjustable hardware block that is controlled with computer-executable instructions written in specialized assembly language or other suitable programming languages to perform certain acts of the invention. The following example is one embodiment of a pixel shader program comprising computer-executable instructions for implementing per-component linear-cubic alpha correction. According to the present embodiment, this program is executed for each pixel. The following program accepts the polynomial ratios in constant register c0 . . . c5 that were preferably prepared beforehand, as described above. The polynomial ratios are calculated when the gamma level or the foreground color is changed. The meaning of each constant register is explained below in comment to the pixel shader program.

```
ps.1.1     // declare pixel shader version
// fetch alpha values from samplers to input registers t0, t1 and t2
tex t0     // fetch red alpha
tex t1     // fetch green alpha
tex t2     // fetch blue alpha
// combine the alpha values into single vector,
// along the way multiplying these values by
// alpha value of foreground color. This requires
// constant registers c0..c2 to be prepared following way:
// c0.rgba = f.a, 0, 0, 0
// c1.rgba = 0, f.a, 0, 0
// c2.rgba = 0, 0, f.a, 0
// where f.a is foreground alpha.
mad r0, t0.a, c0, c0.a  // set red (c0.a replicates 0)
mad r0, t1.a, c1, r0    // set green
mad r0, t2.a, c2, r0    // set blue
// Now r0 contains the alpha vector, referred below as "x".
// Calculate the formula r0 = x + x*(1-x)*(A*x + B),
// where vectors A and B are prepared in constant
// registers c3 and c4 respectively. Due to typical hardware
// limitation (any value in cn should be in {-1,1} diapason)
// the registers really contain decreased values: c3 = A/4 and c4 = B/4.
mad r1, c3, r0, c4         // r1 = (A/4)*x + (B/4)
mul_x4 r1, r1, 1-r0        // r1 = (1-x)*(A*x + B)
mad r0, r0, r1, r0         // r0 = x + x*(1-x)*(A*x + B)
// end of pixel shader program.
```

The following example includes C++-language computer-executable instructions for implementing processes at the polynomial ratios calculator 520.

```
#include <d3d9.h>
// The definition of the structure used to keep cubic-linear
// gamma correction table.
struct GammaTableRow { float c1, float c2, float c3, float c4 };
// Separate instance of GammaTableRow needed for each particular
gamma level;
// it defines following non-linear transformation:
// alpha_corrected =
// alpha + alpha*(1-alpha)*(c1*alpha*f + c2*alpha + c3*f + c4),
// where f is foreground color component.
// The definition of the 4-dimensional vector structure:
struct Vector4d { float r, float g, float b, float a; };
HRESULT PolynomialRatiosCalculator(
    const GammaTable* pTable,
    int gammaLevel,
    const Vector4f& f,  //fore color
    IDirect3DDevice9* pD3DDevice
    )
{
    // fetch the coefficients row for given gamma level:
```

-continued

```
    const GammaTableRow& coefs = pTable[gammaLevel];
    // declare the array of constant registers values:
    Vector4d c[5];
    // calculate the values of constant registers c0 .. c2:
    c[0].r = f.a; c[0].g =   0; c[0].b =   0; c[0].a = 0;
    c[1].r =   0; c[1].g = f.a; c[1].b =   0; c[1].a = 0;
    c[2].r =   0; c[2].g =   0; c[2].b = f.a; c[2].a = 0;
    // calculate values A and B (see comments to pixel shader
    program)
    // in constant registers c3 and c4:
    c[3].r = (coefs.c1*f.r + coefs.c2)/4;
    c[3].g = (coefs.c1*f.g + coefs.c2)/4;
    c[3].b = (coefs.c1*f.b + coefs.c2)/4;
    c[3].a = 0;
    c[4].r = (coefs.c3*f.r + coefs.c4)/4;
    c[4].g = (coefs.c3*f.g + coefs.c4)/4;
    c[4].b = (coefs.c3*f.b + coefs.c4)/4;
    c[4].a = 0;
    // now submit prepared data to pixel shader constant registers:
    HRESULT hr = pD3DDevice->SetPixelShaderConstantF(0,c,5);
    return hr;
}
```

It will be appreciated that the foregoing examples do not include descriptions of other operations that may be performed during rendering. In particular, the foregoing description does not describe texture preparation, output rasterizer adjustment, manipulations with vertex buffers and other actions that may be performed during rendering. These operations are not described because they are standard operations in the usage of Microsoft DirectX®, referred to above. Accordingly, it will be appreciated that the methods, systems and computer program products of the invention may also include other rendering operations, including, but not limited to texture preparation, output rasterizer adjustment, and vertex buffer manipulations.

In summary, the present invention provides alpha correction at a GPU to compensate for a lack of gamma correction. It will be appreciated that this can greatly increase the overall speed for rendering font glyphs and other images. Although many of the examples described above are provided with specific reference to rendering font glyphs, it will be appreciated that the invention also extends to rendering other images other than font glyphs. Accordingly, the present invention broadly extends to rendering any images without gamma correction and in a desired manner by performing alpha correction to compensate for a lack of gamma correction.

OPERATING ENVIRONMENT

Figure 6:
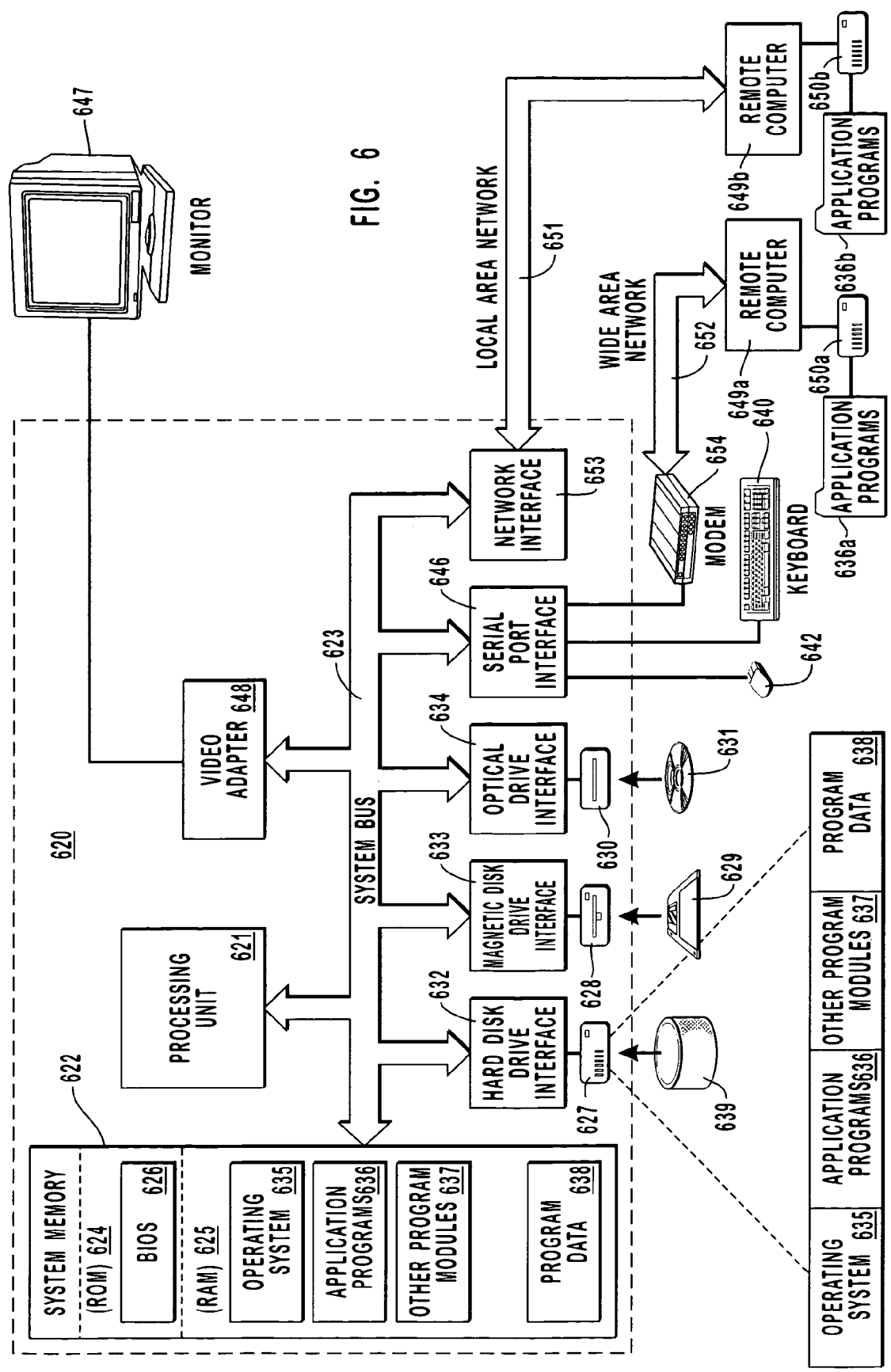
FIG. 6 illustrates one embodiment of an operating system that provides a suitable operating environment for implementing element of the present invention.

FIG. 6 and the following discussion are intended to provide a brief, general description of a suitable computing environment for implementing certain elements of the invention. However, it should be emphasized that the present invention is not necessarily limited to any particular computerized system and may be practiced in a wide range of computerized systems.

According to one embodiment, the present invention includes one or more computer readable media storing computer-executable instructions, such as program modules, that can be executed by computing devices. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments, in addition to individual computing device, with many types of computer system configurations, including personal computers, hand-held devices, multi-processor systems, microprocessor-based or programmable consumer electronics, network PCs, minicomputers, mainframe computers, components thereof, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With specific reference to FIG. 6, an exemplary system for implementing certain elements of the invention includes a general purpose computing system in the form of a conventional computer 620, including a processing unit 621, a system memory 622 comprising computer readable media, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disk drive 630 for reading from or writing to removable optical disk 631 such as a CD-ROM or other optical media. The magnetic hard disk drive 627, magnetic disk drive 628, and optical disk drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. These storage media can also be used to store data structures associating correction coefficients with gamma values, as described above. Although the exemplary environment described herein employs a magnetic hard disk 639, a removable magnetic disk 629 and a removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 639, magnetic disk 629, optical disk 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In this context, the video adapter 648 is considered to include a GPU as described above. In addition to the monitor, personal computers typically include other peripheral output devices (not shown), such as speakers and printers.

The computer 620 may operate in a networked environment using logical connections to one or more remote computers, such as remote computers 649*a* and 649*b*. Remote computers 649*a* and 649*b* may each be another personal computer, a server, a router, a network PC, a peer device or other common network node, and typically include many or all of the elements described above relative to the computer 620, although only memory storage devices 650*a* and 650*b* and their associated application programs 636*a* and 636*b* have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 20 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

It will be appreciated that the present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system that is connected with a display device having a plurality of pixels configured to display an image, the computing system including a graphics processing unit that is configured to perform a blending process with alpha values to control foreground and background colors of the pixels displaying the image, a method for correcting the alpha values received by the graphics processing unit to enable display of the image at the display device without gamma correction, the method comprising:

an act of receiving a set of correction coefficients for one or more predetermined gamma values, at least one of the predetermined gamma values comprising the gamma value of the display device;

an act of receiving one or more filtered alpha values to be corrected prior to performance of a graphics blending process by the graphics processing unit to determine the foreground and background colors of the pixels displaying the image at the display device;

an act of receiving one or more foreground colors to be used in performance of alpha correction on the one or more filtered alpha values;

an act of selecting the set of correction coefficients that correspond to the gamma value of the display device;

an act of computing corrected alpha values with the one or more filtered alpha values, the one or more foreground colors, and the selected set of correction coefficients, the corrected alpha values compensating for a lack of gamma correction;

an act of performing a graphics blending process with the corrected alpha values, operating on the foreground and background colors of the pixels, to determine the pixel values used to display the image at the display device in order to reduce color fringing that otherwise may occur due to an error in alpha correction when gamma correction is not performed; and an act of displaying the image at the display device, and without gamma correction.

2. A method as recited in claim 1, wherein the filtered alpha values include a set of three filtered alpha values for each pixel that is used to display the image at the display device, and wherein the corrected alpha values include a set of three corrected alpha values corresponding to each pixel displaying the image, the corrected alpha values being derived from the filtered alpha values.

3. A method as recited in claim 1, wherein the act of computing the set of correction coefficients for each of the one or more gamma values includes performing optimization for each of the one or more gamma values.

4. A method as recited in claim 3, wherein the one or more gamma values includes gamma values in a range from about 1.0 to about 2.2 and in increments of 0.1, and wherein said optimization is constrained by a set of constraints, said set of constraints chosen to ensure that the corrected alpha values are in a range of between 0 and 1.

5. In a computing system that is connected with a display device having a plurality of pixels configured to display an image, the computing system including a graphics processing unit that is configured to perform a blending process with alpha values to control foreground and background colors of the pixels displaying the image, a method for correcting the alpha values received by the graphics processing unit to enable display of the image at the display device without gamma correction, the method comprising:

an act of receiving a set of correction coefficients for one or more predetermined gamma values, at least one of the predetermined gamma values comprising the gamma value of the display device, wherein the set of correction coefficients for each of the one or more gamma values includes a first correction coefficient, a second correction coefficient, a third correction coefficient, and a fourth correction coefficient;

an act of receiving one or more filtered alpha values to be corrected prior to performance of a graphics blending process by the graphics processing unit to determine the foreground and background colors of the pixels displaying the image at the display device;

an act of receiving one or more foreground colors to be used in performance of alpha correction on the one or more filtered alpha values;

an act of selecting the set of correction coefficients that correspond to the gamma value of the display device; and an act of computing corrected alpha values with the one or more filtered alpha values, the one or more foreground colors, and the selected set of correction coefficients, the corrected alpha values compensating for a lack of gamma correction, wherein each corrected alpha value takes a form of (alpha corrected value)= $(\alpha+(1-\alpha)(c_1\alpha fc_2+c_2+c_3 f+c_4))$, wherein $\alpha$ is the corresponding filtered alpha value, f is the foreground of a pixel corresponding to the alpha value, wherein $c_1$ is the first correction coefficient, wherein $c_2$ is the second correction coefficient, wherein $c_3$ is the third correction coefficient, and wherein $c_4$ is the fourth correction coefficient.

6. A computer program product for use in a computing system that is connected with a display device having a plurality of pixels configured to display an image, the computing system including a graphics processing unit that is configured to perform a blending process with alpha values to control foreground and background colors of the pixels displaying the image, the computer program product comprising one or more computer-readable media having computer-executable instructions for implementing a method for correcting the alpha values received by the graphics processing unit to enable display of the image at the display device without gamma correction, the method comprising:

an act of receiving a set of correction coefficients for one or more predetermined gamma values, at least one of the predetermined gamma values comprising the gamma value of the display device;

an act of receiving one or more filtered alpha values to be corrected prior to performance of a graphics blending process by the graphics processing unit to determine the foreground and background colors of the pixels displaying the image at the display device;

an act of receiving one or more foreground colors to be used in performance of alpha correction on the one or more filtered alpha values;

an act of selecting the set of correction coefficients that correspond to the gamma value of the display device;

an act of computing corrected alpha values with the one or more filtered alpha values and the selected set of correction coefficients, said act of computing utilizing the correction coefficients and the one or more foreground colors, the corrected alpha values compensating for a lack of gamma correction;

an act of performing a graphics blending process with the corrected alpha values, operating on the foreground and background colors of the pixels, to determine the pixel values used to display the image at the display device in order to reduce color fringing that otherwise may occur due to an error in alpha correction when gamma correction is not performed; and an act of displaying the image at the display device, and without gamma correction.

7. A computer program product as recited in claim 6, wherein the one or more computer-readable media include physical storage media.

8. A computer program product as recited in claim 6, wherein the filtered alpha values include a set of three filtered alpha values for each pixel that is used to display the image at the display device, wherein the corrected alpha values include a set of three corrected alpha values corresponding to each pixel displaying the image, the corrected alpha values being derived from the filtered alpha values.

9. A computer program product as recited in claim 6, further comprising an act of computing the set of correction coefficients for each of the one or more gamma values by performing optimization for each of the one or more gamma values, said optimization minimizing an error of the alpha correction.

10. A computer program product as recited in claim 9, wherein the one or more gamma values includes gamma values in a range from about 1.0 to about 2.2 and in increments of 0.1, and wherein said optimization is constrained by a set of constraints, said set of constraints chosen to ensure that the corrected alpha values are in a range of between 0 and 1.

11. A computer program product for use in a computing system that is connected with a display device having a plurality of pixels configured to display an image, the computing system including a graphics processing unit that is configured to perform a blending process with alpha values to control foreground and background colors of the pixels displaying the image, the computer program product comprising one or more computer-readable media having computer-executable instructions for implementing a method for correcting the alpha values received by the graphics processing unit to enable display of the image at the display device without gamma correction, the method comprising:

an act of receiving a set of correction coefficients for one or more predetermined gamma values, at least one of the predetermined gamma values comprising the gamma value of the display device, wherein the set of correction coefficients for each of the one or more gamma values includes a first correction coefficient, a second correction coefficient, a third correction coefficient, and a fourth correction coefficient;

an act of receiving one or more filtered alpha values to be corrected prior to performance of a graphics blending process by the graphics processing unit to determine the foreground and background colors of the pixels displaying the image at the display device;

an act of receiving one or more foreground colors to be used in performance of alpha correction on the one or more filtered alpha values;

an act of selecting the set of correction coefficients that correspond to the gamma value of the display device; and an act of computing corrected alpha values with the one or more filtered alpha values and the selected set of correction coefficients, said act of computing utilizing the correction coefficients and the one or more foreground colors, the corrected alpha values compensating for a lack of gamma correction, wherein each corrected alpha value takes a form of (alpha corrected value)= $(\alpha+(1-\alpha)(c_1\alpha f+c_2\alpha+c_3 f+c_4))$, wherein $\alpha$ is the corresponding filtered alpha value, f is the foreground of a pixel corresponding to the alpha value, wherein $c_1$ is the first correction coefficient, wherein $c_2$ is the second correction coefficient, wherein $c_3$ is the third correction coefficient, and wherein $c_4$ is the fourth correction coefficient.

* * * * *